Aug. 7, 1951   W. E. AMBERG   2,563,632
APPARATUS FOR FORMING ROUNDED BOTTOMS
ON CONICALLY SHAPED CUPS
Filed Feb. 11, 1948   3 Sheets-Sheet 1
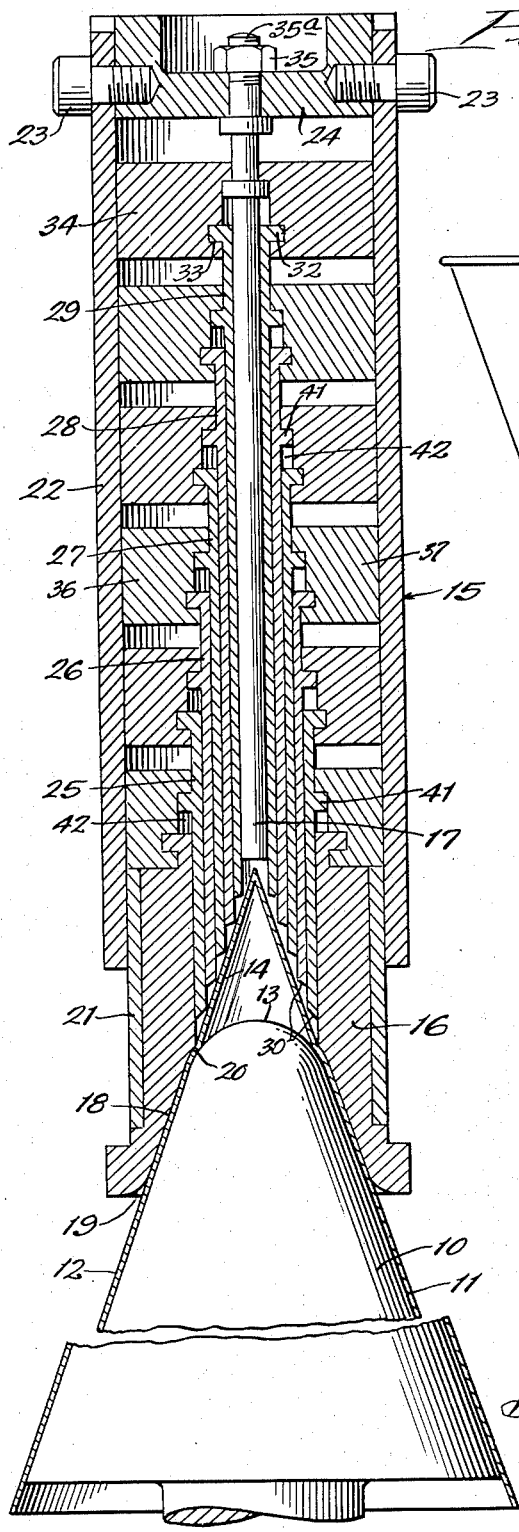
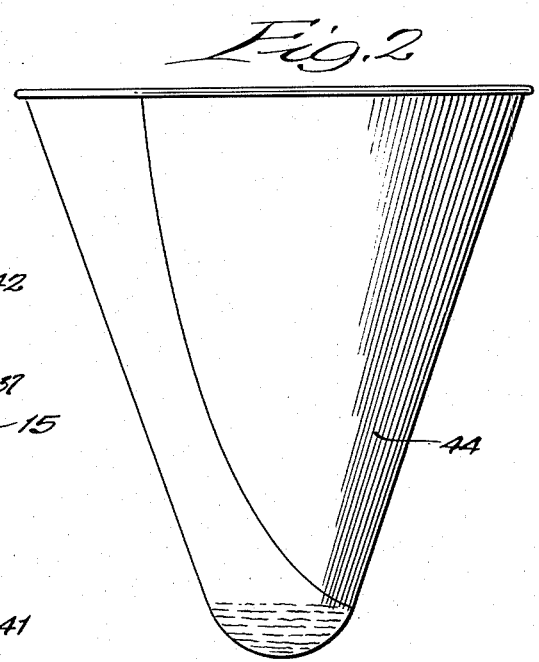
Inventor:
Walter E. Amberg,
By Dawson, Ooms, Booth
and Spangenberg,
Attorneys.

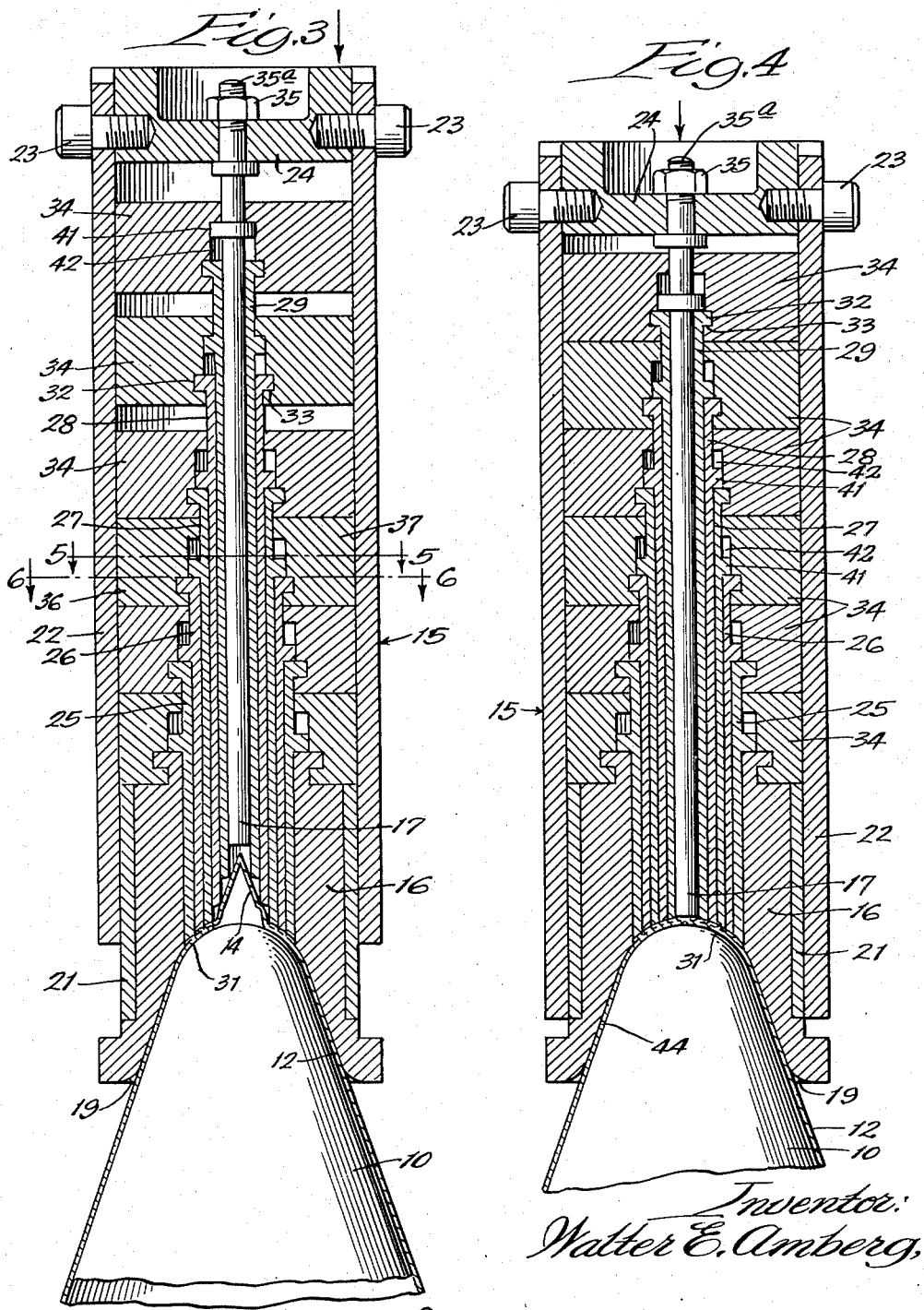

Aug. 7, 1951     W. E. AMBERG     2,563,632
APPARATUS FOR FORMING ROUNDED BOTTOMS
ON CONICALLY SHAPED CUPS
Filed Feb. 11, 1948     3 Sheets-Sheet 3
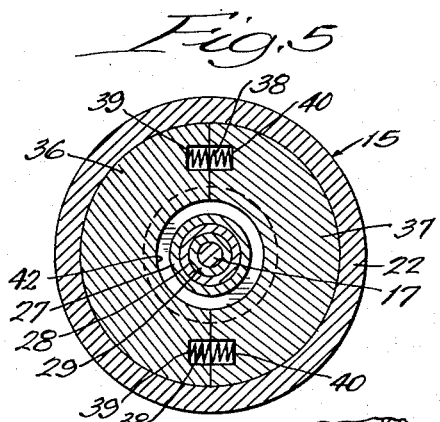
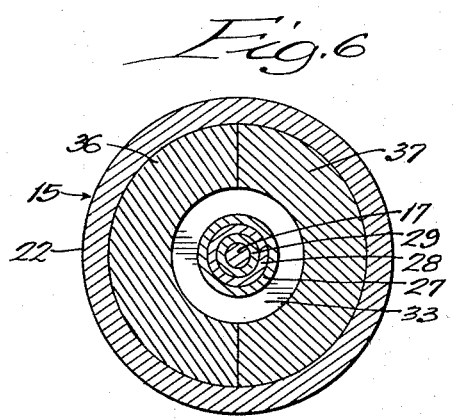
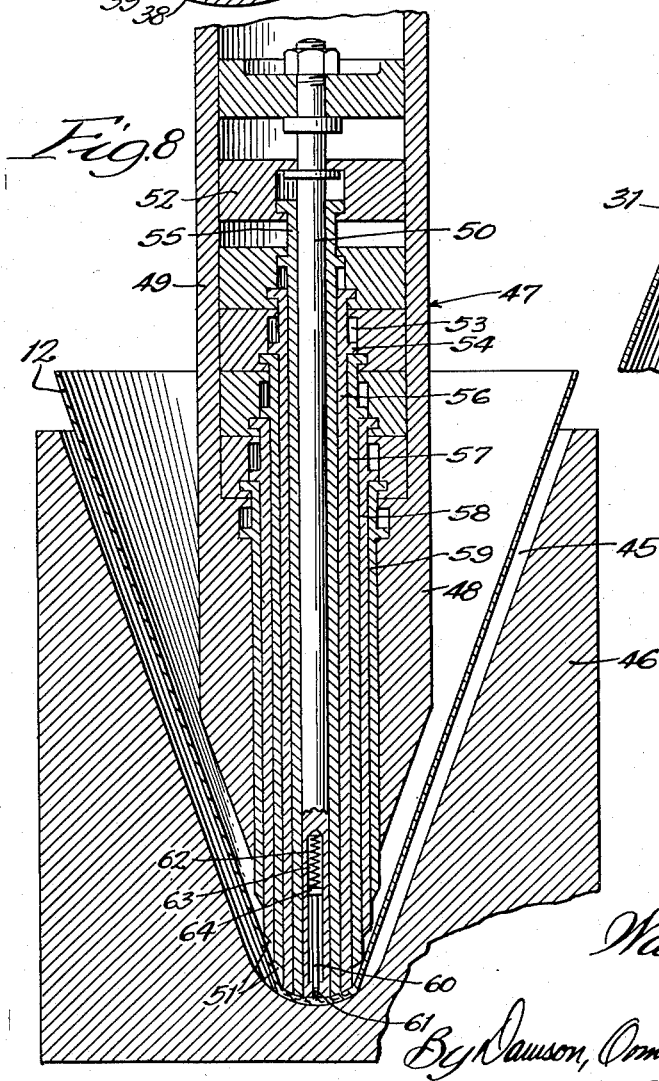
Inventor:
Walter E. Amberg,
By Dawson, Ooms, Booth my Spangenberg,
Attorneys Patented Aug. 7, 1951

2,563,632

UNITED STATES PATENT OFFICE 2,563,632

APPARATUS FOR FORMING ROUNDED BOTTOMS ON CONICALLY SHAPED CUPS

Walter E. Amberg, Beverly Shores, Ind., assignor to Lily-Tulip Cup Corporation, Chicago, Ill., a corporation of Delaware Application February 11, 1948, Serial No. 7,558

1 Claim. (Cl. 93—36.2)

This invention relates to the fabrication of cups formed of paper, and it relates particularly to the apparatus for forming rounded bottoms on paper cups of general conical form.

The invention has for its principal object the production of apparatus for molding the conical end portion of a cup-shaped paper container into a rounded bottom.

Another object is to produce apparatus for rounding the bottom of a conically shaped paper container or cup without impairing the strength or permeability of the paper cup.

A further object is to produce a mold die for converting the apex portion of a conical paper cup into a rounded bottom without creating non-uniform masses and, in reality, strengthening and stiffening the bottom of the paper cup.

A still further object is to produce apparatus consisting of relatively few simple parts arranged to reduce the apex portion of a conical-shaped paper cup in a progressive series of automatically occurring operations whereby the excess material in the conical apex is neatly folded to produce a neat, durable, and stackable paper container having a rounded bottom which is readily accessible to implements for mixing or emptying operations.

These and other objects and advantages of this invention will hereinafter appear, and for purposes of illustration, but not of limitation, embodiments of the invention are shown in the accompanying drawing, in which—

Figure 1 is a sectional elevational view of the molding apparatus embodying the features of this invention and illustrating the arrangement of the parts in an early stage of the molding cycle;

Figure 2 is an enlarged elevational view of the molded paper cup;

Figure 3 is a sectional elevational view similar to that of Fig. 1 but showing the position of parts during an intermediate stage of the molding cycle;

Figure 4 is a sectional elevational view of the mold parts showing their position at the end of the molding cycle;

Figure 5 is a sectional view taken along the line 5—5 of Fig. 3;

Figure 6 is a sectional view taken along the line 6—6 of Fig. 3;

Figure 7 is an enlarged fragmentary sectional view showing in detail the rounded bottom of the molded paper cup; and Figure 8 is a sectional elevational view of a modified form of molding apparatus embodying the features of this invention.

It is a matter of common knowledge that conical-shaped or V-shaped cups and containers, ordinarily used for dispensing drinks at soda fountains, canteens, drinking fountains, and the like, are handicapped because they are formed with a very sharp apex which is a definite hazard and, further, because the limited area in the apical region prevents access thereto of a utensil or other implement for mixing or emptying the ingredients. This is particularly objectionable when it is desired to combine liquid and solid components since there is a tendency for the solids to fall to the bottom of the cup and become lodged in the inaccessible portion from which it is difficult to displace. Frequently these solids comprise the important ingredients in the mix, and not only are they wasted but when discarded with the cup, the solids may provide a hidden danger or hazard from a sanitary point of view.

The sharp apical point is eliminated and access to the bottom of the cup is secured by reforming the conical apex to a rounded bottom which is sufficiently large to permit the free access of eating or stirring implements. Such conical-shaped cups are most economically manufactured from a single strip of sheet material, such as paper, treated paper, and the like, and it is desirable to provide molding means for deforming the conical apex to a rounded bottom, and this is the principal purpose of the apparatus of this invention.

Referring now to Figures 1 to 7 inclusive of the drawing, 10 indicates an upright male mold die part mounted on the stationary platen of a molding press. The die part is formed with sloping side walls 11 which correspond to the slope of the cone-shaped cup 12 formed of a single sheet of resilient material in a manner such as is fully described in my Patents No. 2,235,348 and No. 2,293,036. The rounded end portion 13 on the male die part conforms to the contour of the rounded bottom to which it is desired to convert the conical apex. Thus, when in position to be molded, the cone-shaped cup 12 is backed by the male die part with its conical apex 14 extending upwardly free of the mold.

The desired deformation is effected by advancing a female mold die part 15 toward the male mold member, the female die part having a plurality of concentrically arranged telescoping mold sections adapted to reach the male die part, during such advancing movements, separately and in consecutive order beginning with the outer tubular mold section 16 and ending with the center mold section which is in the form of a spindle 17.

The outer mold section 16 will be considered separate and apart from the other mold sections because it also operates as a positioning member having a sloping mold surface 18 corresponding in slope with that of the side wall of the male mold part with which it cooperates during molding operations. The inclined molding surface 18 terminates in an outwardly curved lip 19 at its lower end and an inwardly curved portion 20 at its upper end which starts the deformation of the conical apex of the cup during molding, as illustrated in Fig. 1. A guide sleeve 21 is provided on its outer wall slidably to receive the lower end portion of a telescoping tubular housing part 22 secured, such as by set screws 23, to a platen 24 adapted to be actuated vertically in the direction toward and away from the male mold part. It will be manifest that the housing part and the platen 24 will be connected to the movable platen of a compression press which may be of the convention type, such as a toggle press or a hydraulically operated ram-type press.

The other mold sections, five of which are shown intermediate the outer mold section 16 and the center spindle 17, are telescoping cylindrical members 25, 26, 27, 28, and 29 respectively of graduating diameters. The lowermost ends 30 of each of these mold members are curvilinear to form a continuous rounded mold surface when in their molding position of adjustment, the rounded surface corresponding generally to the contour of the male mold die part 13 with which these ends cooperate.

By initially arranging the lower ends of the mold sections in vertically spaced-apart relation, simulating a cone in appearance, and then actuating the sections conjointly in the direction for molding, each of the female mold sections reaches its molding position of adjustment at predetermined intervals and in consecutive order commencing with the section nearest the male die part and ending with the one originally farthest away. That is, first the outer mold section 16 engages the male die part to grip the cup therebetween and initiate the deformation thereof, and then the other successively until the center spindle 17 reaches molding position. As each mold section other than the first outer mold section engages the conical apex and moves to its molding position of adjustment, the portion of the conical apex engaged thereby is neatly folded and pressed down upon the corresponding surface of the male die part to form neat and uniform small pleats 31 lying in a horizontal plane. Thus, as the mold sections are moved in the direction for molding, the conical apex is engaged by the mold sections and then pleated one at a time gradually to deform the conical apex in small increments to the shape corresponding to the rounded end portion on the male die part.

In order to secure the desired arrangement and movement of the female mold sections, each section is provided at its upper end with an annular shoulder 32 which is received in an annular groove 33 in one of a plurality of corresponding superposed carrying plates or platens 34. The carrying plate for the center spindle is the platen 24, previously described, the spindle 17 being secured thereto by nut means 35 engaging a screw threaded portion 35a extending through the platen, enabling adjustment between the spindle and the platen.

As shown in Figs. 5 and 6 of the drawings, each carrying plate is formed of a pair of semicircular sections 36 and 37 which are constantly urged outwardly frictionally to engage the inner wall of the housing 22 in which they are disposed by means of a resilient member, such as springs 38, tensionally arranged in contiguous apertures 39 and 40 in each of the semicircular sections.

Another annular flange 41, integral with each of the mold sections other than the outer mold section, is slidable longitudinally for a limited distance in an annular groove 42 formed in the carrying plate next below that which it is associated through the shoulder 32, permitting limited relative longitudinal movement between the various mold sections. The extent of permissable relative sliding movement is calculated to provide the desired longitudinally spaced relation between the molding surface of each of the mold sections when in their retracted position of adjustment and to permit such relative movement in molding as will enable each of the mold sections to reach molding position. It will be manifest that the spaced relation is taken up only after the adjacent mold section has been stopped on reaching molding position, such stoppage resulting either from engagement of the carrying plates one on top of the other or upon movement of the annular flange 41 to its lowermost position in the corresponding slot 42.

Describing now a cycle of operations for converting the conical apex of a cone-shaped paper cup into a conical cup having a rounded bottom, the cone-shaped cup 11 is positioned on the male die part 10 when the female die part 15 is in its retracted position of adjustment. In this position, a spaced relation exists between each of the carrying plates, and each annular flange 41 is disposed in the upper part of its respective groove 42.

As the compression press is operated to displace the housing 22 in direction for molding, the carrying plates 34 and their corresponding mold sections are carried conjointly toward molding position. As previously pointed out, the first mold section to reach molding position is the outer section 16 which serves principally firmly to position the cup and commence deformation, as illustrated in Fig. 1.

It will be apparent at this stage that the mold surfaces on the end of each of the mold sections will be arranged in conical form substantially to grip spaced-apart portions of the conical apex at substantially the same time, thereby to effect the downward movement thereof as a unit in conformance with the successive steps causing folding and pleating of the excessive material contained in the apex portion. As previously pointed out, upon continued movement of the mold sections toward molding position, the next adjacent mold section, such as mold section 25, deforms the portion of material disposed underneath and, because of its curvilinear nature, causes the material to fold. Upon reaching molding position, the combined forces exerted by the mold section, including its weight, the weight of its carrying plate and the frictional forces imparted by the housing, cause the folded portion to become a substantially permanent pleat. In Fig. 3, the arrangement of the mold sections and their corresponding carrying plates are shown during an intermediate portion of the molding cycle, and, in Fig. 4, the final stages of the molding cycle are shown wherein the center spindle finally crushes the remaining pointed end portion of the cup. Thereafter, the applied compressive force of the hydraulic press is operative directly through the engaged carrying plates to force the mold sections as a unit firmly to compress the pleated material into substantially permanent form, as is illustrated in Fig. 7 of the drawing.

Upon retraction of the housing and conjointly the center spindle 17, the mold members are returned to their original position of adjustment. The weights of the various mold sections and their corresponding carrying plates, and especially the apparently greater weight of the outer mold section 16, may be so designated as to be effective gravitationally to resist conjoint movement of the carrying plates with the housing, or the section 16 can be held as the female mold die 15 is lifted. As a result, each carrying plate is lifted to its retracted position only after the annular flange 41 of the adjacent mold section reaches the upper end of the corresponding groove 42, thereby to dispose the carrying plates in the desired spaced-apart relation. Thus, each plate becomes spaced from the ones next adjacent by a distance permitted by the slot 42, and the lower ends of the mold parts are in vertically spaced relation when in their retracted position. When the female mold die 15 is lifted, the finished cup 44 can be ejected or otherwise removed from between the mold parts.

As illustrated in Fig. 8 of the drawings, instead of positioning the cone-shaped cup on the stationary male die part and effecting molding operations with an advancing female mold die, the desired deformation may be effected by casting the paper cup 12 in a cavity 45 in a female die part 46 and deforming the conical apex in the desired manner by a male die part, generally referred to by the numeral 47.

In this modification, the male die part is constructed of a plurality of mold sections, the outer of which 48 is directly connected through the integral housing 47 to the moveable platen of the compression press. In this construction, the center spindle 50 is adapted to be the first to reach molding position, and the outer mold section 48, the last. Therefore, the mold sections in their retracted position are arranged in vertically spaced-apart relation with the molding surfaces 51 appearing in conical form corresponding to the contour of the conical apex of the paper cup to be deformed. The carrying plates 52 are adapted to be carried to their retracted position by the outer mold section 48 and the housing 49. The grooves 53, in which the corresponding flanges 54 of the next adjacent mold section are slidable, are arranged to permit the carrying plates to stack one on top of each other when in their retracted position. As the housing is shifted downwardly, the carrying plates are carried conjointly therewith through frictional engagement and their gravitational forces, the center spindle 50 being the first to reach molding position. The others 55, 56, 57, 58, and 59 respectively, next adjacent, are operative in consecutive order to effect the desired and described folding and pleating action, only, in this instance, pleats may be made on the inner wall of the cup to provide a smooth and rounded surface on the outer wall.

The center spindle 50 is provided with a positioning finger 60 having a pin point 61 on the outer end which is adapted accurately and securely to position the apex of the conical-shaped cup in the center of the female mold part. The finger is resiliently urged to operative position by a coil spring 62 arranged in a cavity 63 in the center spindle and in which the finger, having a piston-like head 64 at the other end, is slidable.

It will be obvious from an inspection of Fig. 8 that in its initial position, the apex of the cup rests on the base of the female mold cavity 45 and that when positioned by the pin point 61, the sides of the cup 12 are in spaced parallel relation with the corresponding sides of the mold cavity. During movement of the mold sections to molding position, the mold surfaces engage the conical apex and help to actuate the cup downwardly as each mold section deforms and pleats its corresponding portion of the conical apex, until finally the cup is compressed between the mold parts when in molding position. As each of the mold sections reaches molding position, its movement is stopped by the opposed mold die part surface and the annular flange 54 integral therewith slides to the extent limited in the corresponding groove 53. During final movement to molding position, such relative movement takes place between the mold sections as will provide a spaced relation between the carrying plates when in molding position which is again taken up as the mold sections are returned to their retracted position of adjustment. It will be apparent that the final compressive force to impart permanence to the pleats passes through the cooperating flanges and grooves 54 and 53 respectively to the mold surfaces.

From the description, it will be apparent that I have produced a new and improved molding apparatus which is simple and efficient in operation effectively and accurately to deform the conical apex of a cup formed of paper into rounded contour by successively folding and pleating small increments of the conical apex in a rather permanent manner. It will be manifest that the described steps take place in a single cycle of operations without in any way weakening the cup or impairing its permeability. It will be further evident that in their final form, the paper cups are substantially capable of containing a large amount of material all of which is accessible to the various implements for mixing or removing purposes, the cups themselves being of a shape readily to be stacked for shipment or dispensing purposes. When desired, adhesives or other coating materials may be disposed on or about the deformed surfaces or the surfaces to be deformed to impart greater permanence to the folds and improve the appearance, impermeability, and stiffness of the final product.

It will be understood that numerous changes in the details of construction, arrangement, and operation may be effected without departing from the spirit of the invention, especially as defined in the following claim.

What is claimed is:

Apparatus for forming a spoon serviceable rounded bottom on a conical paper cup comprising, a male die of conical shape for receiving a conical paper cup and having a rounded convex end portion generally to conform to the shape of the spoon serviceable rounded bottom to be formed on the conical paper cup, a female die mounted for movement toward and away from the male die and including a plurality of concentric telescoping die sections having concave annular end surfaces conforming generally to the shape of the spoon serviceable bottom to be formed on the conical paper cup, means for sequentially moving the outer and then the inner concentric female die sections toward the male die for first gripping the side wall of the conical paper cup between the outer female die section and the male die and circumferentially gathering and pleating an adjacent portion of the side wall of the conical paper cup against the rounded end portion of the male die and then circumferentially gathering and pleating further portions of the side wall of the conical paper cup against the rounded end portion of the male die for forming the spoon serviceable rounded bottom.

WALTER E. AMBERG.

REFERENCES CITED

The following references are of record in the file of this patent:

UNITED STATES PATENTS

| Number | Name | Date |
|---|---|---|
| 1,257,949 | Adelson | Feb. 26, 1918 |
| 1,689,555 | Louisot | Oct. 30, 1928 |
| 2,104,535 | Barbieri | Jan. 4, 1938 |
| 2,220,312 | Barbieri | Nov. 5, 1940 |

FOREIGN PATENTS

| Number | Country | Date |
|---|---|---|
| 56,681 | Germany | May 19, 1891 |